March 12, 1963 W. E. BURCH 3,081,374
ENCAPSULATED DIODE ASSEMBLY
Filed May 27, 1960

INVENTOR.
WILLIAM E. BURCH
BY Paul W. Hemminger
Agent

United States Patent Office 3,081,374

Patented Mar. 12, 1963

3,081,374
ENCAPSULATED DIODE ASSEMBLY

William E. Burch, East Orange, N.J., assignor to International Telephone and Telegraph Corporation, New York, N.Y., a corporation of Maryland Filed May 27, 1960, Ser. No. 32,383
3 Claims. (Cl. 174—52)

This invention relates to improved terminal leads for encapsulated electrical circuit components and more particularly to improved terminal leads for encapsulated semi-conductive devices.

Known types of encapsulated semi-conductor devices have a disadvantage in that the terminal lead junctures with the semi-conductor device surfaces often breaks away. This usually occurs in applicaitons wherein the terminal lead is subjected to pulling, twisting or flexing.

A further disadvantage of these devices is the diminished reliability caused by moisture or atmosphere contaminants seeping along the terminal leads into the semi-conductor junction.

The present invention overcomes these disadvantages by providing improved terminal leads for encapsulated semi-conductor device assemblies which have upsets or shoulders located intermediate their ends and within the bodies of the assemblies.

It is an object of this invention to provide a simply constructed improved terminal lead for encapsulated electrical circuit components.

Another object of this invention is to provide an encapsulated semi-conductor device of improved reliability.

A further object of the invention is to provide a barrier within the body of the device against seepage of moisture or atmospheric contaminants.

The above-mentioned and other features and objectives of this invention and the manner of attaining them will become more apparent and the invention itself will be best understood by reference to the following description of an embodiment of the invention taken in conjunction with the accompanying drawing wherein.

Figure 1:
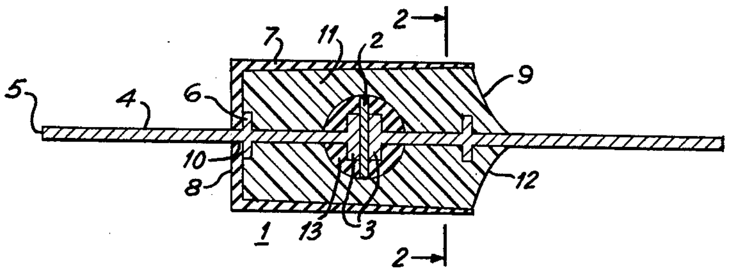
FIG. 1 is a longitudinal cross sectional view of an encapsulated semi-conductor device showing the positioning of the upsets along the terminal leads thereof.
Figure 2:
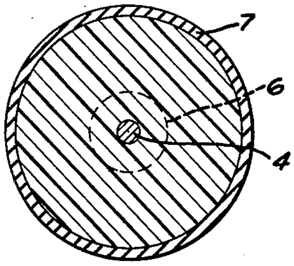
FIG. 2 is an end cross sectional view of the assembly taken along line 2—2 of FIG. 1.
Figure 3:
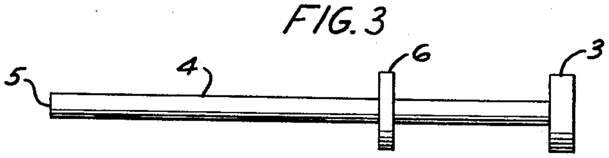
FIG. 3 is an enlarged detailed view of a single improved terminal lead for the assembly.

Referring now to FIG. 1, there is shown a longitudinal cross-section of an encapsulated semi-conductive device 1, which, for the purposes of demonstration is a diode. It should be understood that the invention may be applied with equally improved results to semi-conductive triodes or pentodes, capacitors, resistances or inductances. The semi-conductive junction 2 is placed between the discs 3 of the terminal leads 4 and is attached thereto. A protective coating of varnish 13, having a high dielectric constant, is applied over the semi-conductive junction 2 and the discs 3. Intermediate the disc 3 and the end 5 of each lead, there is disposed a shoulder or upset 6. The whole assembly of the leads and the semi-conductive junction is placed within the cylinder 7 which has end 8 closed and end 9 open. The end 8 is provided with an aperture 10 having a diameter substantially equal to the diameter of the lead 4. The lead 4 extends out of the cylinder 7 through the aperture 10. Further protrusion of the lead 4 is prevented by the shoulder 6 abutting against the inside surface of end 8 of cylinder 7. Shoulder 6 is so located along lead 4 to insure that the semi-conductive junction 2 lies well within the cylinder 7, preferably in the middle thereof. After placement of the whole assembly within the cylinder 7, a suitable insulating material 11 is poured into the open end thereof and effectively seals the junction from the atmosphere. The varnish 13 prevents the material 11 from touching the junction. Capillary action causes the insulating material 10 to assume the curved surface 12 as it sets or hardens. The insulating material 11 may be a thermo-setting, a thermo-plastic resin or any other suitable potting compound.

By assembling the encapsulated semi-conductive device as described above, the upsets 6 are within the body of the cylinder 7 and are therefore completely embedded in the insulating material 11.

It is apparent that the leakage path from the extended portion of the leads 4 to the junction 2 is increased by the surface area of the upsets 6. In addition, the upsets act as anchors in the insulating material and resist any longitudinal or other stresses of the leads 4 which otherwise might be transmitted to the delicate junction.

It is to be understood that the foregoing description of the specific example of this invention is not to be considered as a limitation on its scope.

What is claimed is:

1. A capsule for an electric circuit component comprising:
   - a capsule having a predetermined length and at least one end wall having a central aperture of given diameter disposed therein;
   - a circuit component having a length less than said casing mounted within said casing;
   - a lead having one end connected to said component and the other end extending outside said casing through said aperture;
   - a shoulder portion integral with said lead intermediate its ends abutting the interior surface of said wall, said shoulder portion being disposed a distance from said one end of said lead to position said component substantially equidistant from the ends of said casing and having a transverse dimension greater than the diameter of said aperture to close said aperture to provide a barrier to the passage of moisture or atmosphere contaminants from outside said casing to said component and an anchor to resist stresses which might otherwise be transmitted to said component; and
   - a potting compound filling the space within said casing.

2. A capsule for a semiconductor diode comprising:
   - a cylindrical casing having a predetermined length and at least one circular end wall having a central aperture of given diameter disposed therein;
   - a semiconductor diode having a length substantially less than said casing mounted within said casing;
   - a lead having a disc disposed on one end thereof in a transverse relation to said casing connected to said diode and the other end extending outside said casing through said aperture;
   - a circular upset shoulder portion integral with said lead intermediate its ends abutting the interior surface of said wall, said shoulder portion being disposed a distance from said disc to position said diode substantially equidistant from the ends of said casing and having a diameter greater than the diameter of said aperture to close said aperture to provide a barrier to the passage of moisture or atmosphere contaminants from outside said casing to said diode and an anchor to resist stresses which might otherwise be transmitted to said diode; and
   - a potting compound filling the space within said casing.

3. A capsule for an electric circuit component comprising:
   - a casing having a predetermined length and at least one end wall having a central aperture of given diameter disposed therein;
   - a circuit component having a length less than said casing mounted within said casing;
   - a lead having one end connected to said component and the other end extending outside said casing through said aperture;

a shoulder portion integral with said lead intermediate its ends abutting the interior surface of said wall, said shoulder portion being disposed a distance from said one end of said lead to position said component substantially equidistant from the ends of said casing and having a transverse dimension greater than the diameter of said aperture to close said aperture to provide a barrier to the passage of moisture or atmosphere contaminants from outside said casing to said component and an anchor to resist stresses which might otherwise be transmitted to said component;

a potting compound filling the space within said casing; and a coating enclosing said component and the connection of said one end thereto to isolate said component and the connection of said one end thereto from said compound.

References Cited in the file of this patent

UNITED STATES PATENTS

| | | |
|---|---|---|
| 2,503,429 | Ziegler | Apr. 11, 1950 |
| 2,535,517 | Rhodes | Dec. 26, 1950 |
| 2,943,359 | Sussman | July 5, 1960 |
| 3,009,012 | Polese | Nov. 14, 1961 |

FOREIGN PATENTS

| | | |
|---|---|---|
| 611,719 | Great Britain | Nov. 3, 1948 |